United States Patent [19]

Lom et al.

[11] 4,379,484

[45] Apr. 12, 1983

[54] CONTROL FOR A VARIABLE AIR VOLUME TEMPERATURE CONDITIONING SYSTEM-OUTDOOR AIR ECONOMIZER

[75] Inventors: Duane L. Lom; John F. Klouda, both of La Crosse, Wis.

[73] Assignee: The Trane Company, La Crosse, Wis.

[21] Appl. No.: 224,709

[22] Filed: Jan. 12, 1981

[51] Int. Cl.³ .......................... F25B 29/00; F24F 7/00
[52] U.S. Cl. ........................................ 165/16; 62/180; 236/49; 236/1 EA
[58] Field of Search ................ 165/16; 236/1 EA, 49, 236/13, 91 F, 91 R; 62/180, 177, 178, 179, 182

[56] References Cited

U.S. PATENT DOCUMENTS

| | | | |
|---|---|---|---|
| 2,217,680 | 10/1940 | Haines | 165/16 |
| 3,677,335 | 7/1972 | Weatherston | 165/12 |
| 3,949,807 | 4/1976 | Tyler | 165/16 |
| 4,013,118 | 3/1977 | Zimmer et al. | 165/22 |
| 4,122,893 | 10/1978 | Thompson | 165/16 |
| 4,293,027 | 10/1981 | Tepe et al. | 165/16 |

*Primary Examiner*—Albert J. Makay
*Assistant Examiner*—Harry Tanner
*Attorney, Agent, or Firm*—Carl M. Lewis; Ronald M. Anderson

[57] ABSTRACT

A solid-state control for a variable air volume (VAV) temperature conditioning system adapted to control a plurality of refrigerant cooling stages, and in particular, to modulate an outdoor air economizer. The control includes both an outdoor ambient air and a discharge air temperature sensor. Further included are means for selectively modulating the economizer either in response to the deviation of the discharge air temperature from a setpoint or in response to the discharge air temperature, depending upon the relative magnitudes of the outdoor and discharge air temperature, and upon one or more stages of cooling being energized.

10 Claims, 4 Drawing Figures

DEVIATION OF DISCHARGE AIR TEMP. FROM SETPOINT −(55°F TYPICAL)

CONTROL FOR A VARIABLE AIR VOLUME TEMPERATURE CONDITIONING SYSTEM-OUTDOOR AIR ECONOMIZER

TECHNICAL FIELD

This invention generally pertains to a control for a variable air volume temperature conditioning system, and specifically, to such a control capable of modulating an outdoor air economizer.

BACKGROUND ART

In a variable air volume (VAV) temperature conditioning system, the volume of conditioned air supplied to each comfort zone in a building is proportional to the demand in that zone. Stages of temperature conditioning are energized as required to maintain the supply air at a relatively constant temperature as the total demand on the system varies.

A VAV system often includes an outdoor air economizer for admitting fresh air into the building, thereby reducing the need for mechanical cooling. Depending upon the enthalpy of the outdoor air, a damper assembly on the economizer may be modulated between minimum and maximum positions to control the proportion of outdoor air used for cooling the building interior spaces. If an enthalpy sensor indicates that outdoor air temperature/humidity is excessive, the economizer damper is kept at its minimum position.

Staging controls for VAV systems typically attempt to satisfy the cooling demand first with the outdoor air economizer, and if that is inadequate, thereafter by energizing successive cooling stages. Of course, if the outdoor ambient air temperature is less than the setpoint temperature of the discharge air, outdoor air can be used to cool the building without energizing any refrigerant cooling stages. Conversely, if the outdoor ambient air temperature is greater than the setpoint temperature, it is unlikely that the cooling demand can be met entirely with air supplied by the economizer.

After the first cooling stage is energized, such controls generally either modulate the economizer damper to its minimum open position, or leave it at maximum opening. However, if the economizer is left at maximum open condition when one or more stages of cooling are energized, it is very possible that the system control will energize hot gas bypass, in response to a low compressor suction pressure. The term "hot gas bypass" refers to an operating mode wherein vapor is supplied directly to the evaporator, bypassing the condenser. This mode is implemented by the compressor protection circuit if required to vaporize excess liquid refrigerant in the evaporator, to prevent it from "slugging" the compressor. Low suction pressure may occur when a large volume of relatively cold outdoor air entering through a fully open economizer mixes with and lowers the return air temperature in the VAV duct below that required to vaporize all the refrigerant in the evaporator.

Although use of hot gas bypass prevents damage to a compressor under the above-noted conditions, it is undesirable to operate a cooling system in this manner. Assuming the outdoor ambient air temperature is greater than the setpoint temperature and one or more stages of cooling are energized, it is much more efficient and economical to reduce the use of outdoor air admitted to the economizer to a level at which the evaporator is adequately loaded, while maintaining discharge air temperature at the setpoint. It is likewise generally inefficient to close the economizer to its minimum open position as soon as the stage of cooling is energized, even though this avoids use of hot gas bypass. At minimum economizer opening, the system may not be taking advantage of the cooling available in outdoor air. Even if the temperature of the outdoor air is greater than the setpoint, it is often less than the return air temperature, making it beneficial to use more than a minimum of outdoor air to cool the building.

In consideration of the above, it is an object of the subject invention to control a plurality of refrigerant compressor cooling stages and an outdoor air economizer in a manner which achieves efficient, low cost operation of a cooling system.

Another object of this invention is to modulate the outdoor air economizer of a VAV cooling system in a manner which both minimizes the use of mechanical refrigerant cooling stages, and maintains a relatively constant discharge air temperature.

Yet another object of this invention is to modulate the outdoor air economizer to limit the proportion of outdoor ambient air which is mixed with the return air sufficiently to minimize use of hot gas bypass, if the outdoor air temperature is warmer than the discharge air temperature and one or more stages of cooling are energized.

A further object of this invention is to control stages of refrigerant cooling to minimize cycling, thereby extending the expected operating life of the refrigerant compressor.

A still further object of this invention is to provide a selectable automatic reset of the discharge air temperature setpoint as a function of the outdoor air temperature.

These and other objects of the subject invention will become apparent from the description of the preferred embodiment which follows, and by reference to the attached drawings.

DISCLOSURE OF THE INVENTION

The subject invention is a control for a temperature conditioning system which includes an outdoor air economizer and one or more stages for cooling a comfort zone with discharge air maintained at a setpoint temperature. The control comprises an outdoor ambient air and a discharge air temperature sensor, and means for modulating the economizer to control admission of outdoor fresh air to cool the comfort zone in response to the deviation of the discharge temperature from the set-point temperature. Said means are operative to modulate the economizer in response to the discharge air temperature if: (a) the discharge air temperature is less than a first predetermined value and greater than a second predetermined value; (b) the outdoor ambient air temperature is greater than the setpoint temperature; and (c) at least one stage of cooling is energized.

Said means are further operative to selectively energize one or more stages of cooling in response to the deviation of the discharge air temperature from the set-point temperature.

DESCRIPTION OF THE PREFERRED EMBODIMENT

Figure 1:
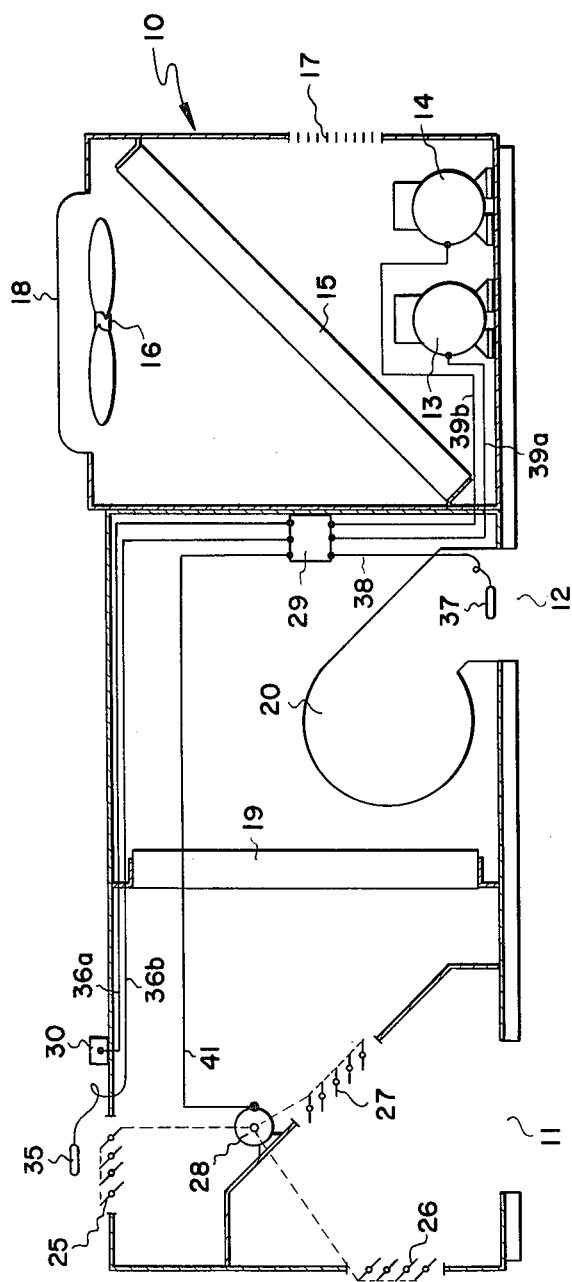
FIG. 1 shows a schematic diagram of a typical VAV system having four stages of cooling and an outdoor air economizer, to which the control of the subject invention is applied.

With reference to FIG. 1, an air conditioning assembly is generally denoted by numeral 10. Air conditioner 10 is adapted for installation on the roof of a building, and is provided with a return air port 11 and a discharge air port 12. These ports are in fluid communication with the return and supply air ducts, respectively, and are installed as part of the temperature conditioning system of the building. This duct work is not shown; however, the design of such duct work for supplying conditioned air to comfort zones in a variable air volume system is well known to those skilled in the art.

The elements which comprise air conditioner assembly 10 include first and second refrigerant compressors 13 and 14, each of which has two stages. Compressors 13 and 14 are also provided with unloading means so that they can be operated with one stage de-energized. This provides a total of four refrigerant compressor stages which may be selectively energized to meet the temperature conditioning demand of the building.

Compressors 13 and 14 are connected in a typical refrigerant cooling cycle and are operative to compress a refrigerant vapor which is supplied to a condenser heat exchanger 15. A condenser fan 16 draws outdoor air from an inlet 17 through the condenser 15, exhausting it through an outlet 18. Heat is transferred from the refrigerant vapor to the outdoor air in condenser 15, causing the refrigerant vapor to condense into a liquid. The condensed liquid is supplied to an evaporator heat exchanger 19 through an expansion valve (not shown). A circulating fan 20 draws air through evaporative heat exchanger 19, and circulates it throughout the building comfort zones. Air passing through evaporator 19, is cooled by heat transfer with the vaporizing refrigerant. The refrigerant vapor then returns to compressors 13 and 14 to repeat the cycle.

Air flowing through heat exchanger 19 and thereafter throughout the building is typically a mixture of return air entering air conditioner assembly 10 through return air port 11 and outdoor air entering through an outdoor air economizer damper 25. The percentage of outdoor air entering the building is determined by the relative opening of outdoor air economizer damper 25, exhaust air damper 26, and mixing damper 27. Each of these three dampers is simultaneously positioned by actuator 28. If outdoor air economizer damper 25 is set to its maximum open condition, exhaust air damper 26 is also set to its maximum open condition, and mixing damper 27 is completely closed. Under these conditions, 100% outdoor ambient air is supplied to the building through discharge air port 12 by circulating fan 20. Actuator 28 is connected to simultaneously modulate mixing damper 27 open as economizer damper 25 and exhaust air damper 26 are modulated toward their respective minimum open positions. This operating relationship between the three dampers 25, 26, and 27 insures proper air pressure balance in the economizer section of air conditioner assembly 10. Actuator 28 typically is a bi-directional motor such as a Honeywell, Inc., Model M975, connected to selectively open or close these three dampers, as described above.

Control means 29 are provided both for selectively energizing the four stages of compressors 13 and 14 in response to cooling demand, and for controlling the modulation of outdoor air economizer 25 by energizing actuator 28. To avoid adverse environment temperature effects on control means 29, the circuitry comprising said means is mounted in the discharge air environment of air conditioner assembly 10. An outdoor air enthalpy sensor 30 and outdoor air temperature sensor 35 are separately connected to control means 29 by leads 36a and 36b, respectively. Likewise, a discharge air temperature sensor 37 is connected to control means 29 by lead 38. Compressor control lines 39a and 39b connect control means 29 to the compressors 13 and 14 for control of compressor staging. Leads 41 connect the actuator means 28 to control means 29. Operation of control means 29 will be explained hereinbelow.

Figure 2:
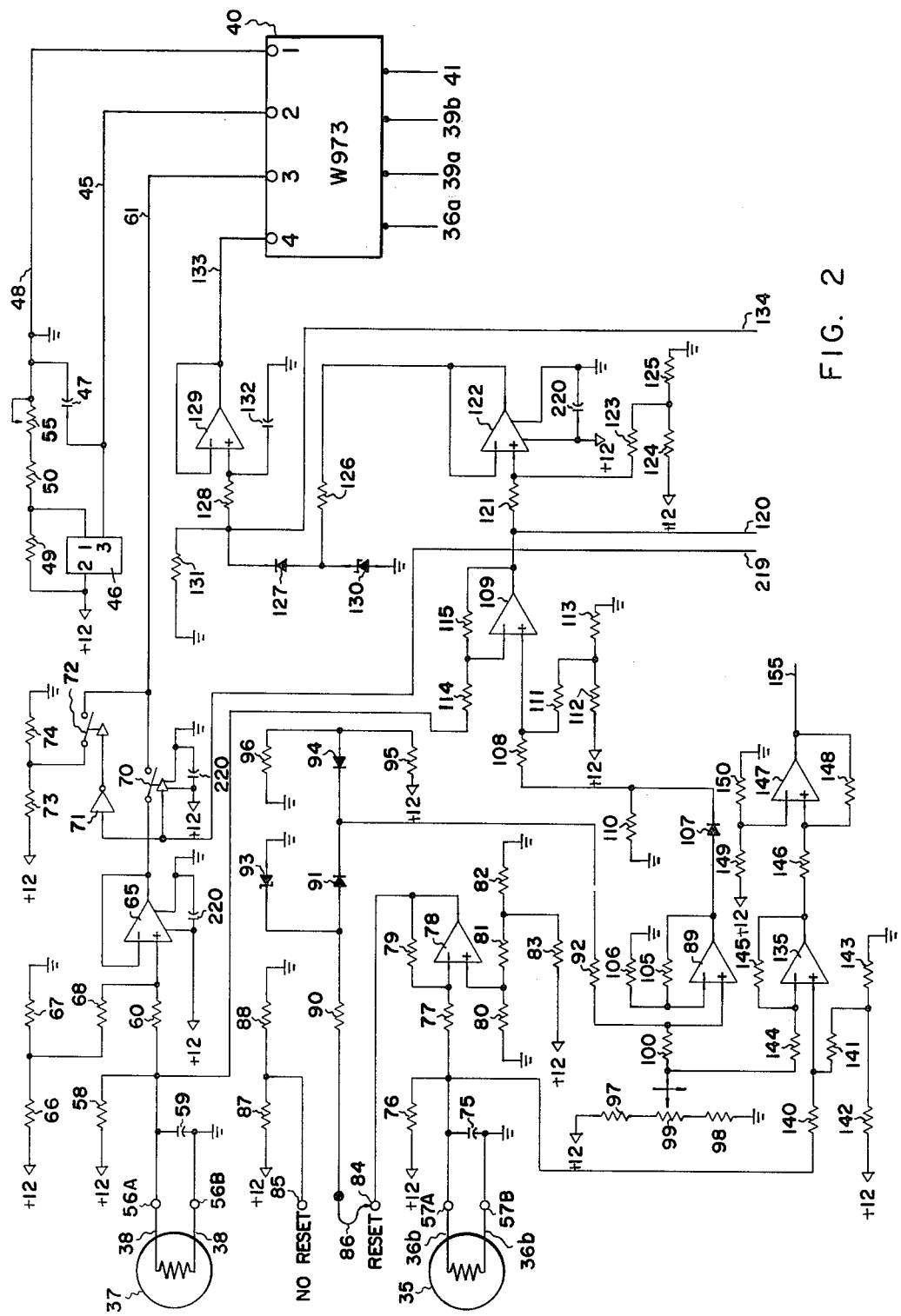
FIG. 2 is a detailed electrical schematic circuit diagram of the analog portion of the VAV system control.
Figure 3:
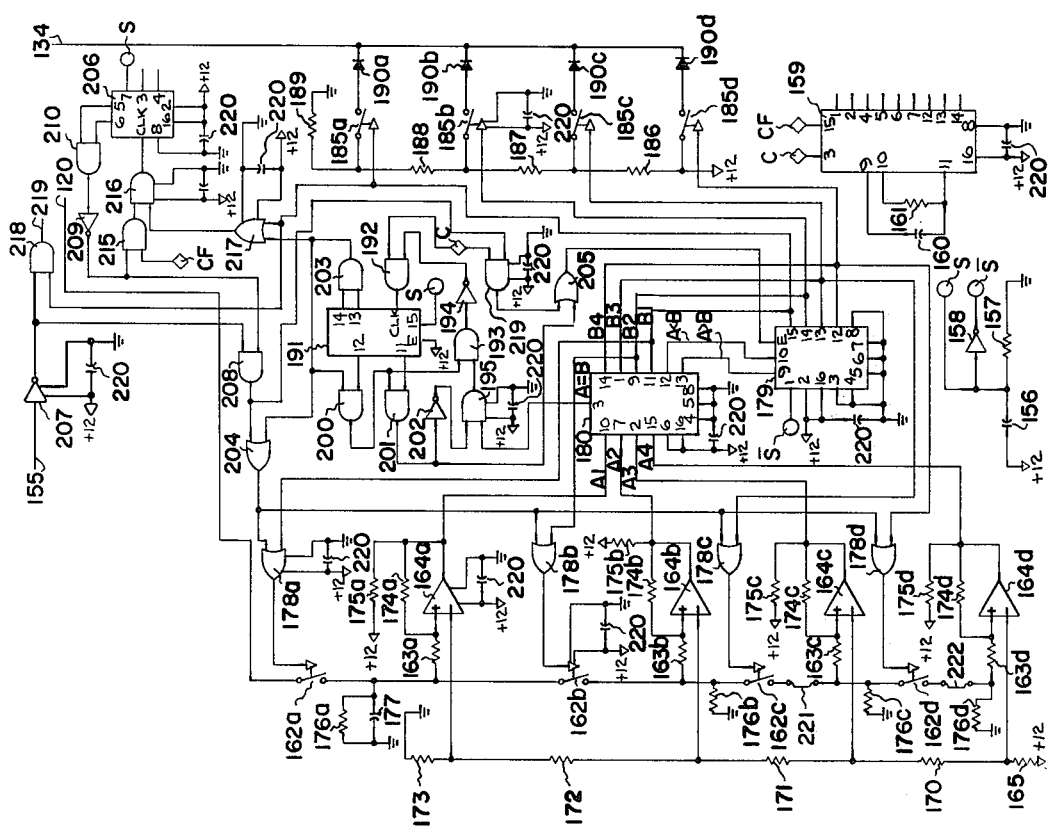
FIG. 3 is a detailed electric schematic circuit diagram of the digital portion of the VAV system control.

Turning now to FIGS. 2 and 3, an electrical schematic circuit diagram for control means 29 is disclosed, the elements of which are grouped into three parts. In FIG. 2, the analog portion of the circuit is shown in combination with the second part, a Honeywell Inc., Model W973 Single Zone Controller, generally denoted by reference numeral 40. The Model W973 is not designed as a control for a VAV temperature conditioning system, however in combination with the analog and digital circuitry disclosed in FIGS. 2 and 3, it controls four refrigerant compressors stages in a VAV system, in response to temperature conditioning demand, and controls modulation of an outdoor air economizer 25. The W973 control 40 is used in the preferred embodiment of the present invention because it implements control functions which would require substantial additional circuitry and because it facilitates field installation and servicing. The functions provided by the W973 control 40 include providing a source of 20 volts DC, relays for energizing refrigerant compressor stages 1-4 of compressors 13 and 14, and a control signal for modulating outdoor air economizer 25. The manner in which the Model W973 control 40 implements its control functions are substantially modified by the remaining analog and digital circuitry comprising control means 29. Only terminals "1" through "4" of the W973 control 40 are specifically identified in the drawings. Connections of the other lead terminated at the W973 control 40 will be apparent to those skilled in the art.

The Model W973 control 40 supplies approximately 20 volts DC to lead 45 of the analog circuitry shown in FIG. 2. A three-pin voltage regulator 46 accepts the 20 volt DC input, and supplies a regulated 12 volts DC to a power supply bus running to each active element in the analog and digital portions of the circuit. A ripple filter capacitor 47 is connected between the 20 volt input on lead 45 and a ground bus lead 48. Lead 48 is connected to ground on the Model W973 control 40, terminal "1". Fixed resistors 49 and 50 and variable resistor 55 are connected in a voltage divider network to the ground bus, and provide means to adjust the output voltage of the three-pin voltage regulator 46 to the desired level, 12 volts DC in the preferred embodiment.

Discharge air temperature sensor 37 is connected to the analog circuit through terminals 56a and 56b; similarly, outdoor air temperature sensor 35 is connected through terminals 57a and 57b. Sensors 35 and 37 are thermistors having negative resistance temperature coefficients, meaning that as the temperature increases the resistance of the sensors 35 and 37 decreases.

Discharge air temperature sensor 37 and a resistor 58 comprise a voltage divider network between the 12 volt DC supply and ground; a capacitor 59 across terminals 56 provides transient noise filtering. The voltage on terminal 56a is inversely proportional to the temperature of the discharge air and is connected through input resistor 60 to the non-inverting input of operational amplifier (op amp) 65. This input serves as a summing junction for that signal and a predetermined voltage supplied by a voltage divider network connected to the 12 volt DC supply and ground, comprising resistors 66 and 67, and input through a resistor 68. Op amp 65 thus modifies the discharge air temperature signal from sensor 37 to an acceptable range for use as an input to the Model W973 control 40. The output signal of op amp 65 is supplied to the Model W973 control 40 terminal "3", through lead 61, but reaches that lead only if a bilateral switch 70 interposed in series therebetween is energized (closed). The condition of switch 70 is in turn controlled by the digital logic circuit as will be explained hereinbelow. The logic sense of the digital signal that controls bilateral switch 70 is inverted by inverter 71, and simultaneously applied to bilateral switch 72. Switches 70 and 72 will therefore always be in opposite states, i.e., when switch 70 is energized, switch 72 is de-energized and vice versa. Switch 72 is in series connection with a predetermined voltage from a voltage divider network comprising resistors 73 and 74, connected in series between the 12 volt DC supply and ground. This predetermined voltage is applied to lead 61 whenever switch 72 is energized and switch 70 is de-energized, and is equivalent to the voltage that would be applied to lead 61 if the discharge air temperature were above a first predetermined value (62° F. in the preferred embodiment).

A transient filter capacitor 75 is also connected across terminals 57a and 57b, and terminal 57b is connected to ground. Resistor 76 and outdoor air temperature sensor 35 comprise a voltage divider network between the 12 volt DC supply and ground; the output of that network, inversely proportional to the outdoor air temperature, is connected to the inverting input of op amp 78 through output resistor 77. Op amp 78 amplifies the input signal with a gain determined by the ratio of the resistance of a feedback resistor 79 to the resistance of the input resistor 77; the output of op amp 78 is also offset by an amount determined by the output of a resistor network connected to the 12 volt DC supply and ground, comprising resistors 80, 81, 82, and 83, said offset voltage being connected to the non-inverting input of op amp 78.

A jumper wire switch comprising terminals 84 and 85, and jumper wire 86 provides a means for manually selecting reset of the discharge air temperature setpoint as a function of the outdoor ambient air temperature. If the jumper wire is connected to the "reset" terminal 84, the output signal from operational amplifier 78 is made available for resetting the discharge air temperature setpoint. On the other hand, if jumper wire 86 is connected to the "no-reset" terminal 85, a predetermined voltage from a voltage divider network comprising resistors 87 and 88 connected in series between the 12 volt supply and ground is applied instead. This predetermined voltage is of a level sufficiently high to inhibit reset by the succeeding circuit.

Assuming that reset action is selected by connection of jumper wire 86 to reset terminal 84, the output of operational amplifier 78 is communicated to the non-inverting input of operational amplifier 89 through a resistor 90, a diode 91, and a resistor 92, connected in series. The common junction of resistor 90 and the anode of diode 91 is connectd to ground through a zener diode 93 which limits the voltage of the reset signal to that equivalent to approximately 70° F. Likewise, the common junction of the cathode of diode 91 and resistor 92 is connected to the cathode of a diode 94, the anode of which is connected to the output of a voltage divider comprising resistors 95 and 96 connected between the 12 volt DC supply and ground. This voltage divider in combination with diode 94 sets the minimum reset voltage which corresponds to an outdoor air temperature of 45° F.

The discharge air temperature setpoint is made manually adjustable by means of a variable voltage divider network comprising fixed resistors 97 and 98 and a variable resistor 99 connected in series between the 12 volt DC supply and ground. The range of adjustment for variable resistor 99 is from 40° to 70° F., and the output voltage from its wiper is connected to the non-inverting input of op amp 89 through an input resistor 100. The voltage proportional to reset as a function of outdoor ambient air temperature and the voltage proportional to the discharge air temperature setpoint are thus summed on the non-inverting input of operational amplifier 89. A feedback resistor 105 connects the output of op amp 89 to its inverting input, this junction is also connected to ground through resistor 106. Operational amplifier 89 thus serves as a summing amplifier, and its output voltage is proportional to the discharge air temperature setpoint, reset as a function of the outdoor ambient air temperature if that function is selected by jumper wire 86. The gain of op amp 78 determines the reset authority. In the preferred embodiment, reset authority is about a 5:1 ratio, i.e., for every 5° F. that the outdoor air temperature drops below 70° F. (down to 45° F.), the setpoint temperature is reduced by 1° F. If "no reset" is selected, a voltage equivalent to an outdoor ambient of 70° F. is applied to the non-inverting input of op amp 89 and reset is thus inhibited.

A series connection of a diode 107 and resistor 108 conduct the output of operational amplifier 89 to the non-inverting input of operational amplifier 109. A relatively high impedance resistor 110 is connected to the common junction of the cathode of diode 107 and resistor 108, and serves to bleed charge to ground. The non-inverting input of operational amplifier 109 adds the output of op amp 89 to a predetermined voltage supplied through an input resistor 111 from a voltage divider network comprising a resistor 112 and a resistor 113 connected in series between the 12 volt DC supply and ground. The inverting input of operational amplifier 109 is connected through resistor 114 to the discharge air temperature sensor voltage at terminal 56a. Feedback resistor 115 connects the output of operational amplifier 109 to its inverting input; op amp 109 thus functions as an inverting differential voltage amplifier with an output proportional to the difference between the reset discharge air temperature setpoint (or merely the setpoint temperature, if reset is not selected) and the discharge air temperature. This signal is representative of temperature conditioning demand and is supplied to the digital portion of the control means circuitry via lead 120 and to the non-inverting input of an operational amplifier 122 through an input resistor 121. A predetermined voltage is added to this input through resistor 123 from a voltage divider network comprising resistor 124 and resistor 125, connected in series between the 12 volt DC supply and ground. The output of op amp 122 is connected back to the inverting input, and is further connected through resistor 126 in series with diode 127 and input resistor 128 to the non-inverting input of operational amplifier 129.

A zener diode 130 limits the voltage at the common junction of the anode of diode 127 and resistor 126 to approximately 5 volts; at any higher voltage, current flows to ground through diode 130. A relatively high valued resistor 131 is used to bleed charge to ground from the common junction of the cathode of diode 127 and resistor 128. A capacitor 132 connects the non-inverting input of op amp 129 to ground, and filters transient noise which may be present on that input, conducting it to ground. The output of op amp 129 is connected back to its inverting input. Op amp 129 functions as an output buffer for providing a signal proportional to temperature conditioning demand to the Honeywell Model W973 control 40 terminal "4", connected to lead 133. Op amp 129 further serves to buffer a staging signal received from the digital circuitry on lead 134 which is connected to the common junction of the cathode of diode 127 and resistor 128.

The voltage level on lead 134 is a function of the number of cooling stages which must be energized to satisfy the temperature conditioning demand, and always exceeds 5 volts DC when one or more stages are required, or energized. It is for this reason that zener diode 130 is included to limit the voltage level of the demand signal passing through diode 127 to no greater than 5 volts. The W973 control for input, terminal "4" connected to the lead 133, is operative to modulate the outdoor air economizer damper 25 between its minimum and maximum open positions as the output voltage from operational amplifier 129 varies between approximately 2½ and 5 volts. Voltages in excess of 5 volts should only exist on lead 133 if provided through lead 134 from the digital circuitry, since these voltage levels cause the W973 control 40 to energize successive cooling stages.

The remaining analog circuitry shown in FIG. 2 and not yet discussed, is used for comparing the outdoor ambient air temperature with the setpoint temperature. The voltage proportional to the outdoor ambient air temperature on terminal 57a is connected to the non-inverting input of operational amplifier 135 through input resistor 140. Also connected to that input through resistor 141 is a predetermined offset voltage from a voltage divider network comprising resistors 142 and 143 connected in series between the 12 volt DC supply and ground. The sum of the voltages from the outdoor ambient air sensor 35 and from the divider network through resistor 141 is compared against the discharge air temperature setpoint connected to the inverting input of op amp 135 through an input resistor 144. A feedback resistor 145 connects the output of op amp 135 to its inverting input; an input resistor 146 connects that output to the non-inverting input of op amp 147. Op amp 135 functions as an inverting differential amplifier, and op amp 147 as a means of introducing hysteresis and offset in the output signal of op amp 135.

The voltage output from operational amplifier 147 is relatively high (about 12 volts DC) if the outdoor ambient air temperature is less than the setpoint temperature. This voltage corresponds to a logic level "1". If the outdoor ambient air temperature is greater than the setpoint temperature, the output voltage from op amp 147 will be approximately 0 volts DC, corresponding to a logic level "0". To provide the hysteresis necessary to insure a stable logic level output from op amp 147, feedback resistor 148 connects the output of op amp 147 back to its non-inverting input. A predetermined voltage derived from a voltage divider network comprising resistors 149 and 150, connected in series between the 12 volt DC supply and ground is supplied to the inverting input of op amp 147. The logic level output from op amp 147 is supplied to the digital portion of the circuit through lead 155.

The digital section of control means 29 shown in FIG. 3 includes provision for a power-up reset pulse required by several of the integrated circuits to properly initialize the functions when the circuit is energized each time. The power-up reset circuitry comprises capacitor 156 in series with resistor 157 connected between the 12 volt DC supply and ground. The junction of capacitor 156 and resistor 157 produces a negative going pulse, and is connected to an inverter 158 to also provide a positive going pulse, when the circuit is first energized. The negative going pulse is supplied to a bus labeled "S", and the output of inverter 158 is supplied to a bus labeled "$\overline{S}$".

Clock pulses used by several of the integrated circuits shown in FIG. 3 are supplied by a 14 stage ripple counter 159, and include a relatively slow pulse rate (approximately 1 pulse per 18 seconds) available on a bus labeled "C", and a faster pulse rate (approximately 1 pulse per 1¼ seconds), available on a bus labeled "CF". The time base for ripple counter 159 is determined by the values of a capacitor 160 and a resistor 161, which are connected to the appropriate pins of counter 159.

As mentioned above, the output of operational amplifier 109 is a signal proportional to temperature conditioning demand. It is supplied to the digital circuitry of control means 29 via lead 120 which is connected to one side of a bilateral switch 162a. As will be described hereinbelow, switch 162a is controlled by logic level signals applied both as a function of time intervals, and of logic conditions occurring at initial circuit power-up. Three other switches 162b, 162c, and 162d successively control the application of the analog signal on lead 120 to voltage comparators 164a through d. As will become apparent from inspection of FIG. 3, the components associated with each of the voltage comparators 164a through d are generally identical in the manner in which they are respectively connected and are similar in function. For example, each voltage comparator 164 includes an input resistor 163a through d connected between the non-inverting input of the voltage comparator and the output side of the corresponding bilateral switch 162. Feedback resistors 174a through d connect the output of each respective voltage comparator 164 to its non-inverting input, providing hysteresis in the operation of the comparator. Likewise, the output of each comparator 164 is connected to the 12 volt DC supply through respective pull-up resistors 175a through d. The pull-up resistors 175 provide a logic level "1" output whenever the inverting input of each comparator 164 exceeds the magnitude of the reference voltage applied to its non-inverting input.

The comparison voltages applied to the inverting inputs of comparators 164 are derived from a voltage divider network comprising resistors 165, 170, 171, 172, and 173 connected in series between the 12 volt DC supply and ground. The output voltage from the common junction of each pair of the series connected resistors comprising this voltage divider network is in turn connected to the inverting input of one of the comparators 164, i.e., the junction of resistors 172 and 173 is connected to comparator 164a; the junction of resistors 172 and 171 is connected to comparator 164b, etc. The reference voltage thus supplied to each of the comparators 164a through d differs from the preceding reference voltage by approximately 4/10 of a volt. It should therefore be apparent that as each of the respective bilateral switches 162 are closed, the analog voltage supplied via lead 120 may be compared to the reference voltage from the voltage divider network, and if the analog voltage exceeds the reference voltage, the output of the respective voltage comparator 164 goes to a logic level 1. Resistors 176a through d are connected to the output side of bilateral switches 162 to bleed off any charge to ground which may exist on the input resistors 163 when bilateral switches 162 are opened. A capacitor 177 is connected in parallel with resistors 176a and serves as a transient filter, conducting any high frequency noise to ground.

Connected to each of the drive inputs of bilateral switches 162a through d are the outputs of OR gates 178a through d, respectively. If either of two inputs to each of OR gates 178 is at a logic level 1 (high), the output of that OR gate goes to a logic level 1, causing its respective bilateral switch 162 to be energized, closing the switch contact. It should be apparent, that if one of the inputs to each of OR gates 178 is caused to go high at timed intervals, the bilateral switches 162 will be closed at each interval, allowing the analog signal present on lead 120 to be applied to the voltage comparators 164.

One of the two inputs to each of OR gates 178 is connected to one of the four output bits of a four-bit shift register 179, i.e., the least significant bit of its four-bit binary word output is connected to OR gate 178a, the most significant bit is connected to OR gate 178d, and the other two bits are connected to OR gates 178b and 178c in ascending order, accordingly. The four output bits of shift register 179 are also connected to the four input bits on the B side of A/B four-bit comparator 180. The four input bits on the A side of comparator 180 are derived from the outputs of voltage comparators 164, again arranged in order with the least significant bit input on the A side connected to the output of comparator 165a, and the most significant bit input connected to the output of comparator 164d. It will thus be apparent, that four-bit comparator 180 compares the logic levels output from voltage comparators 164 present on the A input side to the logic levels input from the four-bit shift register 179 on the B side. Three results are possible: A is equal to B, less than B, or greater than B in magnitude. Each of the four input bits for A and B represent stages of cooling. The four-bit comparator 180 is thus operative to compare a binary word comprising the four bits on the A input with a binary word comprising the four bits on the B input, wherein the binary word A represents the stages of cooling required to meet the present temperature conditioning demand and the binary word B represents the stages of cooling previously energized. For example, if only the first stage of cooling had previously been required to meet the cooling demand, the B binary word may be represented with the binary notation 0001. If the cooling demand increases so that two stages of cooling are required to meet it, the binary word A indicative of the new demand may be represented by 0011. In response, the four-bit comparator 180 produces a logic level 1 on its output line "A>B", which is connected as an input to four-bit shift register 179. Comparator 180 has another output which is also connected as an input to four-bit shift register 179, for "A<B", which in this example would be at logic level 0. In response to a logic level 1 on the "A>B" input to shift register 179, its output would change from 0001 to 0011. As mentioned above, the output from the second least significant bit on four-bit shift register 179 is also connected to one of the two inputs of OR gate 178b and if high, causes it to produce a logic level 1 output, which keeps bilateral switch 162b in an energized state until a drop in cooling demand causes the analog voltage on lead 120 to drop below that required to maintain the output of voltage comparator 164b at a logic level 1 state.

Besides its connection to the B input side of four-bit comparator 180, each bit of the binary bit pattern output from four-bit shift register 179 is also connected to a respective control input of four bilateral switches 185a through d. The switched inputs to bilateral switches 185 are each connected to different output voltages derived from a voltage divider network comprising resistors 186, 187, 188, and 189 connected in series between the 12 volt DC supply and ground. The outputs of switches 185 are each connected through diodes 190a through d to the lead 134 and thereby are connected to the analog portion of the control means 29. The magnitude of voltage applied to lead 134 varies as a function of the stages of cooling called for by the previously discussed digital logic. For example, when binary word B is equal to 0001, bilateral switch 185a is closed causing approximately 5.1 volts to appear on lead 134. Closure of switch 185b causes the voltage to jump to approximately 6.2 volts; closure of switch 185c results in a step voltage of approximately 7.5 volts; and closure of switch 185d increases the voltage to approximately 11.4 volts. This analog voltage signal input through lead 134 is further processed by op amp 129 as described above, and is output to the Model W973 control 40 through lead 133.

Most of the remaining digital circuitry is concerned with timing and control of the initial staging when the circuit is first energized. Timing intervals are generally determined by a binary Up-counter 191 which accumulates clock pulses from the slow clock pulse bus, labeled "C". Clock pulses from this bus are applied to one of two inputs to an AND gate 192, whose output is connected to the clock pulse input terminal of Up-counter 191. The other input to AND gate 192 is derived from another AND gate 193, but is inverted by inverter 194, interposed therebetween. The output of an AND gate is a logic level 1 if and only if both inputs are at logic level 1. Therefore, a clock pulse from slow clock bus C will only be input to Up-counter 191 if both inputs to AND gate 192 are at logic level 1. This occurs only if the output of AND gate 193 is at logic level 0, since a low output would be changed to a logic level 1 by inverter 194.

It will be understood by those skilled in the art that Up-counter 191 is operative to count input clock pulses, achieving a maximum binary output count equal to a total of 15 clock pulses; on the next clock pulse, the count recycles to 0. The "enable" input of Up-counter 191 is connected to the 12 volt DC supply, causing Up-counter 191 to advance its count on the positive going edge of each clock pulse input to it.

One of the inputs to AND gate 193 is connected to the output of an AND gate 195 which in turn has one input from an "A=B" output of the four-bit comparator 180. This output from comparator 180 is at a logic level 1 whenever the binary word A is equal in magnitude to the binary word B, in other words only when a change in cooling stages energized is not required. The other input to AND gate 193 is an output from another AND gate 200 which is also connected to one of two inputs to an AND gate 201. The other input to AND gate 201 is an output from Up-counter 191 which goes to a logic level 1 each time a clock pulse is received by Up-counter 191. The output of AND gate 201 is connected through inverter 202 to the other input of AND gate 195.

One of the two inputs to AND gate 200 is connected to the output of Up-counter 191 which changes state for every two clock pulses input thereto. The other input to AND gate 200 is connected to the output of an AND gate 203, which has two inputs connected to two other outputs of Up-counter 191. These outputs change state every four and every eight clock pulses input to Up-counter 191. Both inputs to AND gate 203 will thus be high from the twelfth through the fifteenth clock pulse input to Up-counter 191; further, the output of AND gate 203 will be at a logic level 1 during this time. Since that output is applied to the input of AND gate 200 along with the output of Up-counter 191 which changes state every other clock pulse, the output of AND gate 200 will be at a logic level 1 only during the fourteenth and fifteenth clock pulses input to Up-counter 191. In addition, since the output of AND gate 200 is applied to the input of AND gate 201 along with the output of Up-counter 191 which changes state with each clock pulse, the output of AND gate 201 will be at a logic level 1 only on the fifteenth clock pulse input to Up-counter 191.

A count inhibit is provided under the condition in which the binary word A equals the binary word B of four-bit comparator 180. That condition is represented by a high logic level signal which is applied to AND gate 195 as described above, and is summed with the inverted output of AND gate 201, such that the output of AND gate 195 goes low on the fifteenth clock pulse. Thus it can be seen that the output of AND gate 195 is low on the fifteenth clock pulse; and, on all other clock pulses, 0 through 14, is only low if A does not equal B. Otherwise, if binary words A and B are equal, the output of AND gate 195 will be at a logic level 1. AND gate 193 is provided to logically "AND" the output of AND gate 195 with the output of AND gate 200, which is high only on the fourteenth and fifteenth clock pulses. If no change of staging is required, i.e., binary word A equals binary word B, the output of AND gate 195 will be high on the fourteenth clock pulse. Likewise, the output of AND gate 200 will be high on the fourteenth clock pulse. AND gate 193 then produces a high output on the fourteenth clock pulse, which is inverted by inverter 194 to a low logic level 0 and applied to one of the inputs of ANd gate 192, thereby inhibiting clock pulses from reaching the clock pulse input of Up-counter 191. If the temperature conditioning demand changes such that the magnitude of the binary word A is no longer equal to the magnitude of the binary word B, the output of AND gate 195 goes low, the output of AND gate 193 goes low; and subsequently, AND gate 192 passes clock pulses to Up-counter 191.

As explained above, both inputs of AND gate 203 are connected to the two most significant bits on the output of Up-counter 191, so that the output of AND gate 203 is high from clock pulses 12 through 15. That output is one of the two inputs connected to an OR gate 204 whose output is connected in common to one input of each of the OR gates 178. Thus, during clock pulses 12 through 15, the output of OR gates 178a through d each go to a logic level 1, thereby energizing each of bilateral switches 162, (if not already energized in response to binary word B). It is during these clock pulses 12 through 15, that voltage comparators 164a through d are enabled to compare the analog voltage present on lead 120 from the analog section to the respective reference voltage applied to their invention inputs. It is only during these four clock pulses that the binary word A input to the four-bit comparator 180 may change, causing either the "A=B", "A>B", or "A<B" output of four-bit comparator 180 to go high. However, the output of four-bit shift register 179 may only change once during each 16 clock pulses input to Up-counter 191, as will be explained below.

Referring again to AND gate 201, its output is high only on the fifteenth clock pulse input to Up-counter 191. That output is connected to one of the two inputs to an OR gate 205, the output of which is connected to the "enable" terminal of four-bit shift register 179. On the fifteenth clock pulse input to Up-counter 191, occurring every 16 clock pulses, four-bit shift register 179 is enabled to increment or decrement one stage of cooling. In the preferred embodiment, this 16 count interval amounts to a delay of approximately five minutes between changes in the stages of cooling. The delay permits the VAV system to react to a change in cooling staging and gives the discharge air temperature time to stabilize before taking further control action.

A second binary Up-counter 206 is used to energize bilateral switch 162a if the outdoor ambient air temperature is greater than the setpont temperature, upon power-up of the circuit. As noted above, an outdoor ambent air temperature greater than the setpoint temperature causes the operational amplifier 147 to have a logic level 0 output present on lead 155 connecting the analog portion of the circuit to the digital portion. Lead 155 is input to inverter 207, and the output of inverter 207 is connected as one of the two inputs to an AND gate 208. This input is at a logic level 1 when the outdoor ambient air temperature is greater than the setpoint temperature.

The second input to AND gate 208 is derived from an inverter 209 connected to the output of an AND gate 210. The two inputs to AND gate 210 are connected to the most significant and second most significant binary output bits of Up-counter 206 respectively. The output of AND gate 210 is high on the 12th through 15th clock pulses input to Up-counter 206. The output of inverter 209 is also connected as one of the inputs to an AND gate 215, the other input being derived from the fast clock pulses produced by the 14 stage counter 159 and output on the bus labeled "CF". The output of AND gate 215 is in turn connected to one of the two inputs to an AND gate 216, and its output is connected to the clock input of Up-counter 206. The second input to AND gate 216 is connected to the output of an OR gate 217. One of the two inputs to OR gate 217 is a connection to the output of AND gate 203. The second input is connected to the least significant output bit of binary word B from the four-bit shift register 179. Thus, whenever the first stage of cooling is energized, OR gate 217 is supplied with a logic level 1 on this input. That same logic level is also input to an AND gate 218, its other input being a signal supplied on lead 155 inverted by inverter 207. The signal output from AND gate 219 is a logic level 1 only if both the outdoor ambient air temperature is greater than the setpoint and the first stage of cooling has been energized. This condition is input to the analog circuitry on lead 219 and is used to energize either bilateral switch 70 or 72 as explained above.

The relatively fast clock pulses applied to one of the inputs of AND gate 215 only reach the Up-counter 206 if the other input of AND gate 215 is at a logic level 1. This condition occurs when the input to inverter 209 supplied by AND gate 210 is low. Further, the output of AND gate 210 is low until the twelfth fast clock pulse is input to Up-counter 206.

Thus, for the first 12 fast clock pulses after power-up reset, a logic level 1 is input to both AND gate 216 to enable fast clock pulses to reach the count of 12, and to one of the inputs to AND gate 208 from inverter 209. If the outdoor ambient air temperature exceeds the setpoint, the second input of AND gate 208 will also be high causing its output to be high. The high logic level propagates through OR gate 204 to OR gates 178a through d, enabling bilateral switches 162a through d. The output of AND gate 208 is also connected to one of the two inputs to an AND gate 219, the second input of which is connected to the slow clock pulse generated by 14 stage counter 159. The output of AND gate 219 is thus high when three conditions are met: (a) the occurrence of a slow clock pulse, (b) an outdoor air temperature greater than the setpoint, and (c) less than 12 fast clock pulses being totalized in Up-counter 206. That output from AND gate 219 is connected to a second input of OR gate 205, whose output enables the four-bit shift register 179. At initial start-up of the system, assuming the occurrence of all three conditions noted above, a first stage of cooling may be energized to meet the temperature conditioning demand without waiting for the normal five-minute delay to elapse, as required normally between staging changes. After 12 fast clock pulses have been input to Up-counter 206, the output of AND gate 210 goes high causing the output of inverter 209 to go low, inhibiting further clock pulse input to Up-counter 206, and causing the output of AND gate 208 to go low. Up-counter 206 is thus effective to override the five minute staging delay only at startup, and is thereafter locked out.

To insure proper operation of the system upon its being first energized, Up-counter 191 and Up-counter 206 are both connected to the power-up reset signal S, provided as explained above. Likewise, the four-bit shift register 179 is connected to the inverted reset signal $\overline{S}$ supplied from inverter 158. These signals reset each of the counters and the shift register to an initialized condition when the circuit is first energized.

As will be noted from the parts list for active components used in the control means 29 of the preferred embodiment which are included hereinbelow, quad bilateral switches,, quad op amps, a hex inverter, a dual binary counter, a quad voltage comparator and quad two input AND gates and OR gates are used in the preferred embodiment, since these multiple element IC's are more efficient in space and cost than separate elements. Each of the integrated circuits is connected to the 12 volt DC supply and the ground bus, as appropriate. An isolation capacitor 220 is connected between the 12 volt DC supply and ground bus near each IC to prevent the propagation of transients through the circuit as the logic level on any of the integrated circuits changes state.

It should be apparent that if only two or three cooling stages are available in the temperature conditioning system rather than four, circuitry associated with the unused stages should be disabled. In consideration thereof, jumper wires 221 and 222 are provided between the output of bilateral switch 162c and input resistor 163c, and between the output of bilateral switch 162d and input resistor 163d, respectively. Clipping or disconnecting jumper wire 221 prevents the analog signal on lead 120 from reaching the third and fourth voltage comparators 164c and 164d. Likewise, interrupting current through jumper wire 222 prevents the analog voltage on lead 120 from reaching voltage comparator 164d if only three stages of cooling are available. Jumper wires 221 and 222 thus provide expedient means for modifying the circuit, for use in a system with only two or three stages of mechanical air conditioning.

FUNCTIONAL OPERATION OF THE INVENTION

In a VAV system, the discharge air temperature setpoint would typically be set to 55° F. by manual adjustment of variable resistor 99. If the outdoor ambient air temperature measured by sensor 35 is less than the selected setpoint, operational amplifier 147 produces a high logic level 1 output which is inverted by inverter 207, causing AND gate 218 to produce a logic level 0 output on lead 219. That signal is inverted by inverter 71, thereby energizing bilateral switch 72. Closure of bilateral switch 72 supplies a predetermined DC voltage to terminal "3" of the Model W973 controller 40, the magnitude of which causes the Model W973 control 40 to react as if the discharge air temperature were in excess of 62° F. The Model W973 control 40 is designed to modulate an economizer damper such as damper 25 in response to the discharge air temperature if the discharge air temperature is within the range of 50° to 62° F. However, when the Model W973 control 40 is "tricked" into sensing a discharge air temperature in excess of 62° F., it modulates the economizer damper as a function of the deviation of the discharge air temperature from the setpoint, i.e., from a minimum open position if the discharge air temperature is 1° or less than the setpoint to a maximum open position if the discharge air temperature is 1° or more than the setpoint.

From the standpoint of operating cost and efficiency, it is of course desirable to utilize the outdoor ambient air for cooling a building and for maintaining the discharge air temperature at the desired setpoint without using any stages of mechanical refrigerant cooling whenever possible. This makes the best use of the free cooling available from outdoor ambient air. Provided that the enthalpy sensor 30 connected to the Model W973 control 40 indicates that the enthalpy of the outdoor air is acceptable, control means 29 are operative to use outdoor air; otherwise, the enthalpy sensor *overrides*, closing economizer damper 25 to its minimum open position.

Should the outdoor ambient air temperature increase so that it is greater than the setpoint temperature, the input to AND gate 218 from inverter 207 goes to a logic level 1; however, the output of AND gate 218 does not go to a logic level 1 unless at least one stage of temperature conditioning is energized. Once the output of AND gate 218 on lead 219 goes high, bilateral switch 70 is energized, thereby providing a signal on lead 61 to terminal "3" of the W973 control 40, proportional to the discharge air temperature. This allows the Model W973 control 40 to modulate the economizer damper 25 in response to the discharge air temperature, i.e., from a minimum open position when the discharge air temperature is 50° F. to a maximum open position when the discharge air temperature is 62° F. Once the first stage of cooling is de-energized, or if the outdoor ambient air temperature decreases to less than the setpoint temperature, the Model W973 control 40 will begin to modulate the economizer damper 25 as a function of the signal output on lead 133 to its terminal "4". This signal is of course proportional to the deviation of the discharge air temperature from its setpoint value.

Assuming that the outdoor ambient air temperature is greater than the setpoint for the discharge air temperature, the analog signal proportional to this deviation from setpoint on lead 120 may rise to a level in excess of the reference voltage on the non-inverting input of comparator 164a. Approximately every 5 minutes, bilateral switches 162 are energized to apply the analog voltage present on lead 120 to the non-inverting inputs of comparators 164. Once a voltage in excess of the reference voltage is applied to the non-inverting input of comparator 164a, its output goes high changing the binary word A from a 0000 to a 0001. The "A>B" output of four-bit comparator 180 then goes high, resulting in a change in the output of the four-bit shift register 179, so that the binary word B also reads 0001. The appearance of a 1 on the least significant bit of binary word B energizes bilateral switch 185a, causing a voltage to appear on lead 134 connected to terminal "4" of the Model W973 control 40, which is sufficient in magnitude to cause control 40 to energize the relay controlling the first stage of cooling, i.e., control 40 energizes the first refrigerant compressor 13 with one stage unloaded.

In approximately five minutes thereafter, timing signals from Up-counter 191 cause bilateral switches 162 to again close, enabling a voltage comparison by comparators 164. If the magnitude of the voltage on lead 120 has dropped to less than that provided by the hysteresis level established by resistor 174a, the output of comparator 164a changes to a logic level 0 causing a high output on the A less than B connected to the four-bit shift register 179. This changes the binary word B so that it reads 0000, de-energizing bilateral switch 185, and thereby causes the Model W973 control 40 to turn-off the first stage of cooling. Additional stages of cooling are added or deleted in an analogous manner. Should the result of an analog voltage comparison indicate that no change of cooling staging is required, the four-bit comparator 180 produces a logic level 1 on its "A=B" output, which in conjunction with AND gates 195, 193 and 192 inhibits the clock pulse input to Up-counter 191, disabling the four-bit shift register 179 from changing the staging condition. Bilateral switches 162a through d remain energized and continue to input the analog voltage supplied on lead 120 to comparators 164. At such time as the analog voltage changes sufficiently to cause one of the comparators 164 to change its output state, the "A=B" output of four-bit comparator 180 goes low re-enabling the clock pulse count. Thus, it will be understood that during normal operation, stages of cooling cannot be added or deleted any more frequently than at five-minute intervals; however, stages of cooling may be added or deleted at any time after a five-minute interval has elapsed. The only exception to this rule occurs during initial startup, in conjunction with the operation of Up-counter 206, as explained above.

Figure 4:
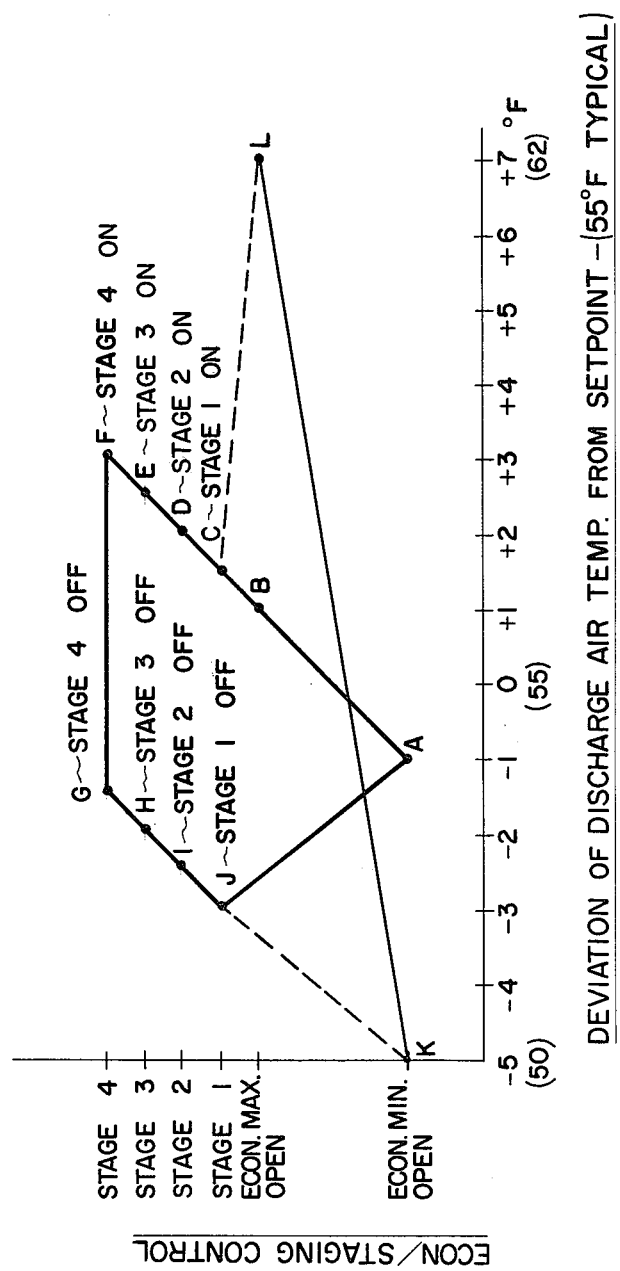
FIG. 4 is a graph illustrating the control functions of the subject invention.

FIG. 4 is a graphic illustration of the operating functions of the present invention as applied to a cooling system in which four stages of cooling are provided. In this system, it is again assumed that the setpoint temperature for the discharge air is 55° F.; furthermore, to simplify the discussion it will also be assumed that jumper wire 86 is connected to the "no reset" terminal 85. In FIG. 4, line segment AB defines the modulation of economizer damper 25 by control means 29 when the outdoor ambient air temperature is less than the 55° setpoint temperature. Point A represents the economizer damper 25 at its minimum open position, and point B represents its maximum open position. As the discharge air temperature deviates from the setpoint temperature by ±1° F. control means 29 are operative to modulate the economizer damper between its minimum and maximum open positions. Line AB defines the modulation of economizer damper 25 until two conditions occur. If the outdoor ambient air temperature is greater than the setpoint temperature and as soon as one or more stages of cooling are energized, modulation of the economizer damper 25 is defined by line segment KL, where K represents the minimum open position of economizer damper 25, and L represents its maximum open position. During the occurrence of the two conditions noted above, the economizer damper 25 is modulated in response to the discharge air temperature, between the limits 50° to 62°, as defined by the internal circuitry of the Model W973 control 40. For example, supposing that the outdoor ambient air temperature increases from 55° F. to 58° F., the discharge air temperature deviation from setpoint will exceed 1½° F., causing control means 29 to turn on the first stage of refrigerant cooling (represented by point C on the graph). As soon as the first stage of cooling is energized, modulation of the economizer damper 25 reverts to the slope defined by line segment KL. Economizer damper 25 therefore closes to slightly less than 50% of its normal opening as the discharge air temperature starts to drop. This helps stabilize the falling discharge air temperature by throttling the volume of outdoor air admitted to the system and mixed with the relatively warmer return air entering evaporator heat exchanger 19, yet the need for hot gas bypass is substantially minimized.

At least five minutes must elapse before stage 1 can be cycled off at point J on the graph, or stage 2 energized as indicated at point D. Although the first stage of cooling is energized at a deviation above setpoint of 1½° F. at point C, it is not de-energized until 3° F. below setpoint. Likewise, stage 2 is energized at a deviation of +2° F., point D, but is de-energized at a deviation of 2½° below setpoint. In a similar manner stages 3 and 4 are energized as shown at points E and F on the graph, corresponding to a discharge air temperature deviation of 2½° and 3° F. above setpoint, and are de-energized at 2° and 1½° F. below setpoint, points H and G respectively.

If stage 1 is de-energized, or if the outdoor air temperature drops below the setpoint temperature, modulation of economizer damper 25 immediately reverts to the slope defined by line segment AB. This insures maximum energy savings by utilization of the outdoor ambient air whenever possible.

The effect of connecting jumper wire 86 to the "reset" terminal 84 is to increase the setpoint temperature with regard to control of economizer damper 25 and of cooling stages 1-4 as a function of the outdoor ambient air temperature in the range of 45° through 70° F. For each 5° that the outdoor ambient air temperature is below 70° F., the discharge air temperature setpoint is increased by 1° F., up to a maximum of 5° F. increase. The 5° maximum corresponds to a minimum outdoor air temperature of 45° F. It should be noted that reset of the discharge air temperature setpoint does not effect modulation of the economizer according to the slope defined by line segment KL; however, it does cause the modulation according to the slope defined by line segment AB to be shifted to the right, as the setpoint temperature is reset to a higher value.

Although in the preferred embodiment, the Honeywell Model W973 control 40 is used as part of the control means 29, it will be understood by those skilled in the art that separate analog circuitry could be provided in place of the Model W973 control 40, which would carry out the same functions which it provides. This would involve construction of a 20 volt DC power supply, provision of separate relays to control each stage of cooling, provision of analog circuitry to modulate the economizer damper 25 as a function of both the discharge air temperature and the deviation of the discharge air temperature from the setpoint, and provision of an enthalpy sensor override. Construction of such circuitry is believed well known to those of ordinary skill in the art.

The following table discloses the manufacturer and Model/Type for the active components used in the preferred embodiment of control means 29. It will be understood that other components of equivalent function and capability could be used in their place.

| Reference Numbers | Description | Manufacturer | Type or Model |
|---|---|---|---|
| 46 | Voltage Regulator | National Semiconductor | LM317MP |
| 70, 72, 162, 185 | Quad Bilateral Switches | RCA | CD4016BE |
| 65, 78, 89 108, 122 129, 135, 147 | Quad Op Amps | National Semiconductor | LM324N |
| 71, 158 194, 202, 207, 209 | Hex Inverter | RCA | CD4069UBE |
| 192, 193, 195, 200, 203, 208, 210, 215, 216, 218, 219 | Quad 2-Input AND Gates | RCA | CD4081BE |
| 159 | 14 Stage Counter | RCA | CD4060BE |
| 164 | Quad Voltage Comparators | National Semiconductor | LM339N |
| 178, 204, 205, 217 | Quad 2-Input OR Gates | RCA | CD4071BE |
| 180 | 4 Bit Binary Comparator | National Semiconductor | MM74C85N |
| 191, 206 | Dual Binary Up-counter | RCA | CD4520BE |
| 179 | 4 Bit Shift Register | RCA | CD40194BE |

It is further to be understood that modifications such as those noted above will be apparent to those skilled in the art within the scope of the invention, as defined in the claims which follow.

We claim:

1. A control for a temperature conditioning system which includes an outdoor air economizer comprising
   a. an outdoor ambient air temperature sensor;
   b. a discharge air temperature sensor; and
   c. means for selectively modulating the economizer in one of two modes, the first mode being in response to temperature conditioning demand and the second mode being in response to the discharge air temperature, said one mode being selected as a function of the temperature conditioning demand and the outdoor ambient temperature, wherein the temperature conditioning demand is determined by the deviation of the discharge air temperature from a setpoint.

2. A control for a temperature conditioning system which includes an outdoor air economizer and one or more stages for cooling a comfort zone with discharge air maintained at a setpoint temperature, comprising
   a. an outdoor ambient air temperature sensor;
   b. a discharge air temperature sensor; and
   c. means for modulating the economizer to control the admission of outdoor fresh air to cool the comfort zone in response to the deviation of the discharge air temperature from the setpoint temperature, unless
      i. the outdoor ambient air temperature is greater than the setpoint temperature and
      ii. at least one stage of cooling is energized;
   in which case, said means are operative to modulate the economizer in response to the discharge air temperature as it varies between first and second predetermined values.

3. The control of claim 2 wherein, when said means are modulating the economizer in response to the discharge air temperature, said means modulate the economizer between a maximum open position and a minimum open position as the temperature of the discharge air varies between the first predetermined value and the second predetermined value, respectively.

4. The control of claim 2 wherein said means are further operative to selectively energize one or more stages of cooling in response to the deviation of the discharge air temperature from the setpoint temperature.

5. A control for a temperature conditioning system in which an outdoor air economizer and a plurality of cooling stages may be selectively energized to meet a cooling demand in a comfort zone, into which the flow of temperature conditioned air is varied in response to temperature therein, said control comprising
   a. a discharge air temperature sensor;
   b. an outdoor ambient air temperature sensor;
   c. first means for selectively energizing and de-energizing cooling stages and modulating the economizer to control the proportion of outdoor air used to temperature condition the comfort zone in response to the deviation of the discharge air temperature from a setpoint, said first means further being operative to modulate the economizer in response to the discharge air temperature rather than to its deviation from the setpoint, if the discharge air temperature is less than a first predetermined value and greater than a second predetermined value;
   d. second means, responsive to the outdoor ambient air temperature sensor, and operative to prevent the first means from modulating the economizer in response to the discharge air temperature, unless i. the outdoor ambient air temperature is above the setpoint for the discharge air temperature; and ii. one or more stages of cooling are energized.

6. The control of claim 5 wherein, when said first means are modulating the economizer in response to the discharge air temperature, said first means modulate the economizer between a maximum open position and a minimum open position as the temperature of the discharge air varies between the first predetermined value and the second predetermined value, respectively.

7. The control of claims 3 or 6 wherein the first predetermined value is 62° F. and the second predetermined value is 50° F.

8. The control of claims 1, 2, or 4 further comprising means for sensing the enthalpy of outdoor ambient air and modulating the economizer to a condition admitting minimum outdoor air, in response to the outdoor ambient air enthalpy exceeding a predetermined maximum level, said enthalpy responsive means overriding the other economizer modulating means.

9. The control of claims 2 or 5 further comprising timer means for delaying energizing a stage of cooling for a predetermined interval after the control is energized if the outside ambient air temperature is less than the setpoint.

10. The control of claim 5 wherein said second means include means for resetting the setpoint upward in proportion to the deviation of the outdoor ambient air temperature below a predetermined value.

* * * * *